T 860,005

DEFENSIVE PUBLICATION

UNITED STATES PATENT OFFICE

Published at the request of the applicant or owner in accordance with the Notice of Apr. 11, 1968, 849 O.G. 1221. Identification is by serial number of the application and the heading indicates the number of pages of specification, including claims, and of sheets of drawing contained in the application as originally filed. The file of this application is available to the public for inspection; reproduction may be purchased for 30 cents per sheet.

Applications published under the Defensive Publication Program have not been examined as to the merits of alleged invention. The Patent Office makes no assertion as to the novelty of the disclosed subject matter.

PUBLISHED MARCH 18, 1969

860 O.G. 678

604,120

PURIFICATION OF ORGANIC CHEMICALS BY SELECTIVE EXUDATION FROM SOLID SUPERSATURATED SOLUTION IN ANOTHER ORGANIC MATERIAL

John W. Tamblyn, P.O. Box 92, Jonas Ridge, N.C. 28641, and Gordon C. Newland, P.O. Box 511, Kingsport, Tenn. 37662

Filed Dec. 23, 1966. Published Mar. 18, 1969

Class 260—94.9

No Drawing. 19 Pages Specification

Crude organic materials may be purified by incorporating them into an organic matrix material in an amount in excess of normal compatibility under ambient conditions and thereafter causing the organic materials to exude from the organic matrix in purified form. Incorporation of the organic materials into the organic matrix materials is usually accomplished under elevated temperatures whereat both components are in a fluid state. Subsequent cooling of the blended materials results in the exudation of the purified organic material from the organic matrix. The method is particularly suitable for purifying various stabilizer compounds such as antioxidants, UV inhibitors, and the like, using polyolefins as the organic matrix material.